(12) United States Patent
Ueno et al.

(10) Patent No.: US 8,738,416 B2
(45) Date of Patent: May 27, 2014

(54) INFORMATION PROCESSING APPARATUS AND COMPUTER READABLE MEDIUM

(75) Inventors: Yuichi Ueno, Kanagawa (JP); Manabu Ueda, Kanagawa (JP); Yuhei Shimada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/028,739

(22) Filed: Feb. 16, 2011

(65) Prior Publication Data

US 2012/0041799 A1 Feb. 16, 2012

(30) Foreign Application Priority Data

Aug. 13, 2010 (JP) ................................. 2010-181285

(51) Int. Cl.
*G06Q 10/00* (2012.01)
*G06Q 10/06* (2012.01)

(52) U.S. Cl.
CPC ........ *G06Q 10/0635* (2013.01); *G06Q 10/0639* (2013.01); *G06Q 10/06395* (2013.01)
USPC .......................... 705/7.28; 705/7.38; 705/7.41

(58) Field of Classification Search
CPC ................................................ G06Q 10/0635
See application file for complete search history.

(56) References Cited

U.S. PATENT DOCUMENTS

| | | | | |
|---|---|---|---|---|
| 5,504,900 A | * | 4/1996 | Raz ......................................... 1/1 |
| 6,330,546 B1 | * | 12/2001 | Gopinathan et al. ............. 705/35 |
| 6,363,411 B1 | * | 3/2002 | Dugan et al. ................... 709/202 |
| 6,442,748 B1 | * | 8/2002 | Bowman-Amuah .......... 717/108 |
| 6,535,592 B1 | * | 3/2003 | Snelgrove ................. 379/114.07 |
| 6,853,974 B1 | * | 2/2005 | Akifuji et al. ................. 705/7.26 |
| 7,035,919 B1 | * | 4/2006 | Lee et al. ....................... 709/223 |
| 7,047,177 B1 | * | 5/2006 | Lee et al. .......................... 703/22 |
| 7,215,758 B2 | * | 5/2007 | Collins ..................... 379/265.09 |
| 7,225,249 B1 | * | 5/2007 | Barry et al. .................... 709/227 |
| 7,289,964 B1 | * | 10/2007 | Bowman-Amuah ........... 705/1.1 |

(Continued)

FOREIGN PATENT DOCUMENTS

| | | |
|---|---|---|
| JP | 2007-183807 A | 7/2007 |
| JP | 2007183807 A * | 7/2007 |

(Continued)

OTHER PUBLICATIONS

Ueda et al., (2007). ROBAS: Real Organization Behavior Audit Service. Technical Report No. 17. 1-3.*

(Continued)

*Primary Examiner* — Brett Feeney
(74) *Attorney, Agent, or Firm* — Sughrue Mion, PLLC

(57) ABSTRACT

An information processing apparatus includes a difference calculation module, an addition module, and an output module. The difference calculation module calculates a difference between a first information amount that is generated between a first person in charge and a second person in charge when a business that constitutes a business process is finished and a second information amount that is estimated to be generated between the first person in charge and the second person in charge when the business that constitutes the business process is finished. The addition module adds the differences calculated by the difference calculation module in a combination of the first person in the business process and the second person in the business process or in other business process related to the business process. The output module outputs the sum of the differences calculated by the addition module as risks of the business processes.

7 Claims, 10 Drawing Sheets

(56) References Cited

U.S. PATENT DOCUMENTS

| | | | |
|---|---|---|---|
| 7,337,155 B2* | 2/2008 | Yoshida | 706/15 |
| 7,386,046 B2* | 6/2008 | Fallon et al. | 375/240 |
| 7,584,161 B2* | 9/2009 | Forbes et al. | 706/46 |
| 7,590,726 B2* | 9/2009 | Raden et al. | 709/224 |
| 7,657,436 B2* | 2/2010 | Elmore et al. | 705/1.1 |
| 7,698,148 B2* | 4/2010 | Lavu et al. | 705/1.1 |
| 7,716,592 B2* | 5/2010 | Tien et al. | 715/744 |
| 7,768,543 B2* | 8/2010 | Christiansen | 348/14.08 |
| 8,311,899 B1* | 11/2012 | Barton | 705/26.8 |
| 2002/0013854 A1* | 1/2002 | Eggleston et al. | 709/234 |
| 2003/0084056 A1* | 5/2003 | DeAnna et al. | 707/100 |
| 2003/0120502 A1* | 6/2003 | Robb et al. | 705/1 |
| 2003/0236691 A1* | 12/2003 | Casatl et al. | 705/8 |
| 2004/0040025 A1* | 2/2004 | Lehtinen | 718/104 |
| 2004/0083389 A1* | 4/2004 | Yoshida | 713/201 |
| 2004/0127194 A1* | 7/2004 | Lippelt | 455/406 |
| 2005/0114501 A1* | 5/2005 | Raden et al. | 709/224 |
| 2005/0114502 A1* | 5/2005 | Raden et al. | 709/224 |
| 2005/0125809 A1* | 6/2005 | Chessell | 719/318 |
| 2005/0132048 A1* | 6/2005 | Kogan et al. | 709/225 |
| 2005/0187809 A1* | 8/2005 | Falkenhainer | 705/9 |
| 2005/0281263 A1* | 12/2005 | Miyamoto et al. | 370/389 |
| 2006/0059107 A1* | 3/2006 | Elmore et al. | 705/64 |
| 2006/0153173 A1* | 7/2006 | Beck et al. | 370/352 |
| 2006/0178917 A1* | 8/2006 | Merriam et al. | 705/7 |
| 2006/0184473 A1* | 8/2006 | Eder | 706/20 |
| 2007/0019717 A1* | 1/2007 | Laroia et al. | 375/222 |
| 2007/0124185 A1* | 5/2007 | Elkin et al. | 705/8 |
| 2007/0150480 A1* | 6/2007 | Hwang et al. | 707/10 |
| 2007/0179987 A1* | 8/2007 | Lim | 707/200 |
| 2007/0188594 A1* | 8/2007 | Yoshino | 348/14.1 |
| 2007/0211141 A1* | 9/2007 | Christiansen | 348/14.08 |
| 2008/0040191 A1* | 2/2008 | Chakravarty et al. | 705/9 |
| 2008/0060051 A1* | 3/2008 | Lim | 726/1 |
| 2008/0066149 A1* | 3/2008 | Lim | 726/1 |
| 2010/0293268 A1* | 11/2010 | Jones et al. | 709/224 |
| 2011/0113006 A1* | 5/2011 | Sakaguchi et al. | 707/602 |
| 2011/0208556 A1* | 8/2011 | Nagahara et al. | 705/7.14 |
| 2012/0096557 A1* | 4/2012 | Britton et al. | 726/25 |

FOREIGN PATENT DOCUMENTS

| | | | |
|---|---|---|---|
| JP | 2009-059075 A | | 3/2009 |
| JP | 2009-064114 A | | 3/2009 |
| JP | 2009059075 A | * | 3/2009 |
| JP | 2009064114 A | * | 3/2009 |

OTHER PUBLICATIONS

Ueda et al., ROBAS: Real Organizational Behavior Audit Service, Technical Report No. 17. 1-3 (2007).

* cited by examiner

FIG. 4

| BUSINESS ID (402) | DATE (404) | PERSON IN CHARGE ID (406) |
|---|---|---|
|  |  |  |

| ID (502) | DATE (504) | LOCATION (506) | SET OF PERSON IN CHARGE IDS (508) | MEETING TIME (510) |
|---|---|---|---|---|
|  |  |  |  |  |

| ID (602) | DATE (604) | SOURCE ADDRESS PERSON IN CHARGE ID (606) | SET OF SENDER PERSON IN CHARGE IDS (608) |
|---|---|---|---|
|  |  |  |  |

| ID | DATE | SET OF PERSON IN CHARGE IDS FOR MEETING | MEETING TIME |
|---|---|---|---|
|  |  |  |  |

FIG. 8

| BUSINESS ID | DATE | PERSON IN CHARGE A ID | PERSON IN CHARGE B ID | COMMUNICATION AMOUNT |
|---|---|---|---|---|
|  |  |  |  |  |

FIG. 9

| BUSINESS ID | PERSON IN CHARGE A ID | PERSON IN CHARGE B ID | COMMUNICATION AMOUNT |
|---|---|---|---|
|  |  |  |  |

INFORMATION PROCESSING APPARATUS AND COMPUTER READABLE MEDIUM

CROSS-REFERENCE TO RELATED APPLICATIONS

This application is based upon and claims priority under 35 USC 119 from Japanese Patent Application No. 2010-181285, filed Aug. 13, 2010.

BACKGROUND

Technical Field

The present invention relates to an information processing apparatus and an computer readable medium.

SUMMARY OF THE INVENTION

According to an aspect of the invention, an information processing apparatus includes a difference calculation module, an addition module, and an output module. The difference calculation module calculates a difference between a first information amount that is generated between a first person in charge and a second person in charge when a business that constitutes a business process is finished and a second information amount that is estimated to be generated between the first person in charge and the second person in charge when the business that constitutes the business process is finished. The addition module adds the differences calculated by the difference calculation module in a combination of the first person in charge in the business process and the second person in charge in the business process or in other business process related to the business process. The output module outputs the sum of the differences calculated by the addition module as risks of the business processes.

BRIEF DESCRIPTION OF THE DRAWINGS

Exemplary embodiments of the invention will be described in detail based on the following figures, wherein:

FIG. 4 is an explanatory diagram illustrating an example of a data structure of a business process instance table;

FIG. 5 is an explanatory diagram illustrating an example of a data structure of an activity log table;

FIG. 6 is an explanatory diagram illustrating an example of a data structure of an electronic mail log table;

FIG. 7 is an explanatory diagram illustrating an example of a data structure of a phone/TV conference (video conference) log table;

FIG. 8 is an explanatory diagram illustrating an example of a data structure of an instance and communication amount table;

FIG. 9 is an explanatory diagram illustrating an example of a data structure of an expected communication amount table;

DETAILED DESCRIPTION

Exemplary embodiments of the invention will be described with reference to the accompanying drawings.

Figure 1:
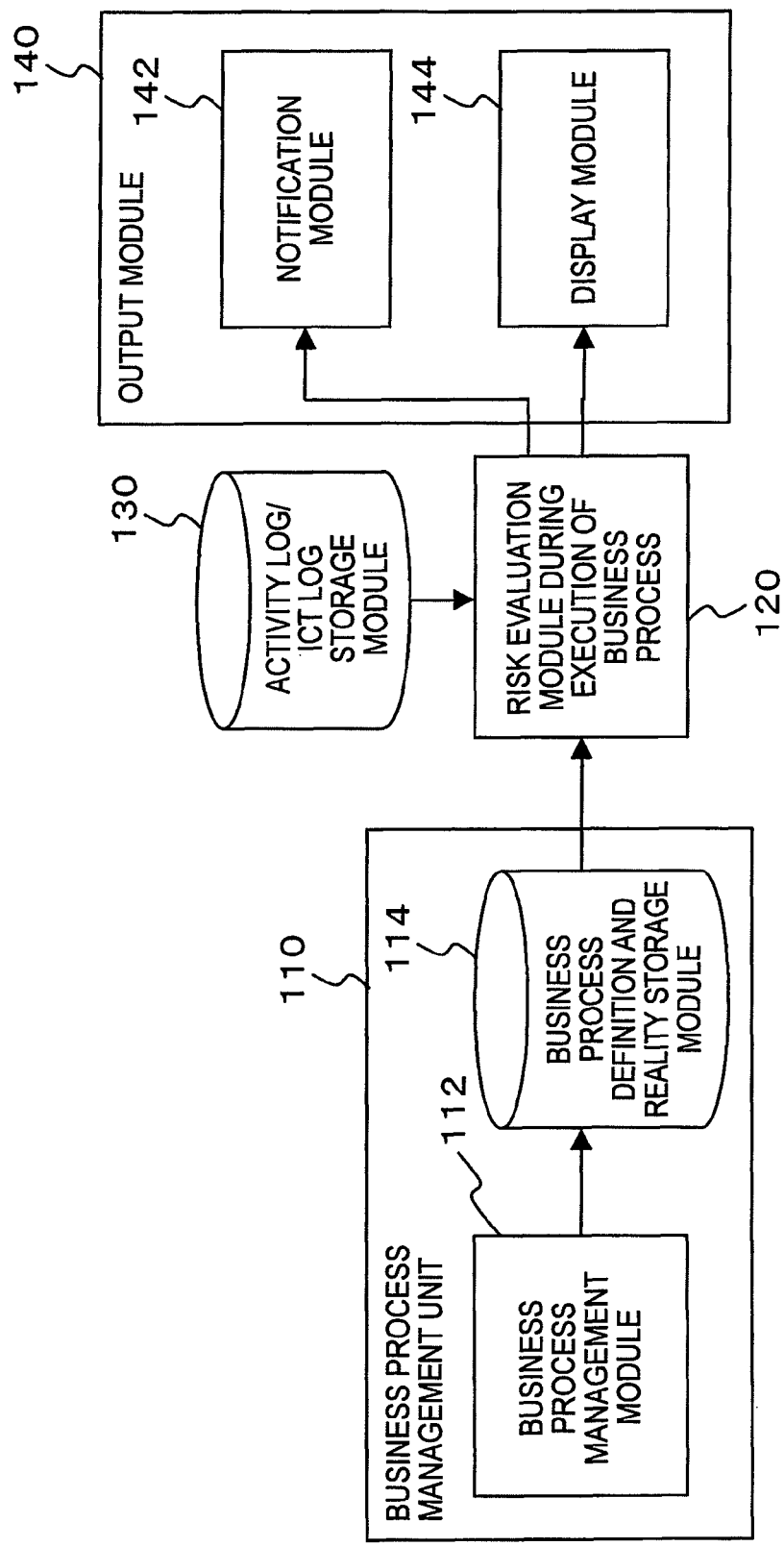
FIG. 1 is a diagram illustrating the configuration of a conceptual module according to a configuration example according to an exemplary embodiment of the invention.

FIG. 1 is a diagram illustrating the configuration of a conceptual module according to a configuration example according to an exemplary embodiment of the invention. The term "module", as used herein, generally means a logically separable software (computer program) or hardware component and the like. Accordingly, in an exemplary embodiment of the invention, the module means not only a module in a computer program but also a module in a hardware configuration. Because of this, in an exemplary embodiment of the invention, computer programs that function as the modules (a program for executing respective procedures in a computer, a program for making a computer function as respective means, and a program for realizing the respective functions in a computer), systems and methods will also be explained. However, although the wordings "memorize", "store", and the equivalents thereof are used for convenience in explanation, they mean storing in a storage device or controlling to store in a storage device in the case when a computer or a program is exemplified. Also, a module may correspond to a function in a one-to-one manner, and in mounting, one module may be configured as one program, plural modules may be configured as one program, or conversely, one module may be configured as plural programs. Also, the plural modules may be executed by one computer, and in a distributed or parallel environment, one module may be executed by plural computers. In this case, one module may be included in another module. Also, hereinafter, the term "connection" may be used as not only a physical connection but also a logical connection (data exchange, instruction, reference relations between data, and the like). The wording "predetermined" means determination before the subject processing, and in an exemplary embodiment of the invention, it is determined in accordance with the situation or condition at the time not only before the processing according to an exemplary embodiment of the invention starts but also before the subject processing even after the processing according to an exemplary embodiment of the invention starts or in accordance with the situation or condition up to the time.

Also, the term "system" or "apparatus" includes a configuration the is realized by one computer, hardware, apparatus, or the like in addition to a configuration in which plural computers, hardware, apparatuses, or the like are connected by a communication means such as a network (that includes a communication connection in a one-to-one manner) or the like. The terms "apparatus" and "system" are used as a wording having the same meaning. Of course, the term "system" does not include merely a social "structure" (social system) that is an artificial contract.

Also, in the case of executing processes by respective modules or executing plural processes in a module, the subject information is read from a storage device for each process, and the result of the process is written in the storage device after the process is executed. Accordingly, with respect to the reading from the storage device before the process and the writing in the storage device after the process, the explanation thereof may be omitted. Here, the storage device may include a hard disk, a RMM (Random Access Memory), an external storage medium, a storage device through a communication line, a register in a CPU (Central Processing Unit).

An information processing apparatus according to an exemplary embodiment of the invention outputs risks in business processes, and as illustrated in an example of FIG. 1, includes a business process management device 110, a risk evaluation module 120 during execution of a business process, an activity log/ITC log storage module 130, and an output module 140.

The business process management device 110 includes a business process management module 112, a business process definition and reality storage module 114. The business process management device 110 defines the business process and manages to execute the business actually in accordance with the definition of the business process. This may be an existing business process management device.

The business process is composed of plural businesses (in the case of configuring a business process, they are called steps), and is defined by the dependence relationships among the respective businesses. Of course, the business contents executed in the respective businesses are also defined.

Figure 2:
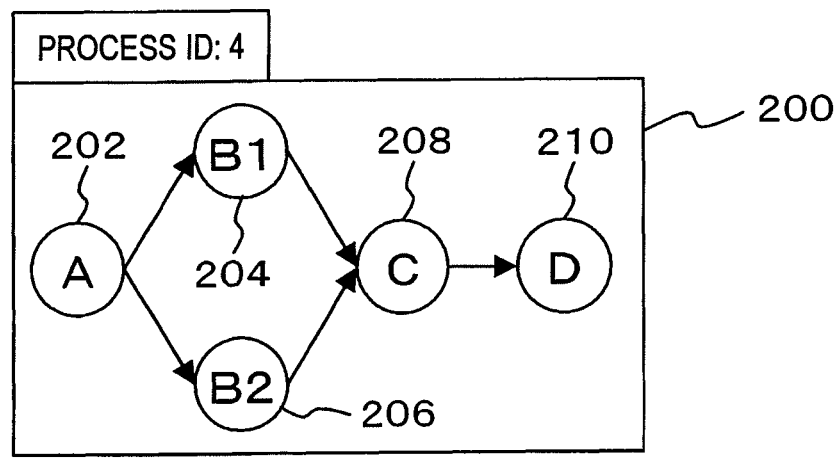
FIG. 2 is an explanatory diagram illustrating an example of a definition of a business process.

An example of definition (model) of a business process is illustrated in FIG. 2. FIG. 2 is an explanatory diagram illustrating an example of definition of a business process. The business process definition 200 is composed of a business A (202), a business B1 (204), a business B2 (206), a business C (208), and a business D (210), and is defined so that the business B1 (204) and the business B2 (206) are executed after the business A (202), the business C (208) is executed after the business B1 (204) and the business B2 (206), and the business D (210) is executed after the business C (208). Data that indicates the business process definition 200 is stored in the business process definition and reality storage module 114. Specifically, any data structure that may realize such a network structure may be used. For example, the data structure may be a list structure, a table structure, and the like. In this case, to the business process definition, a process ID (Identification) which is a code that may inherently identify the business process definition is attached.

Figure 3:
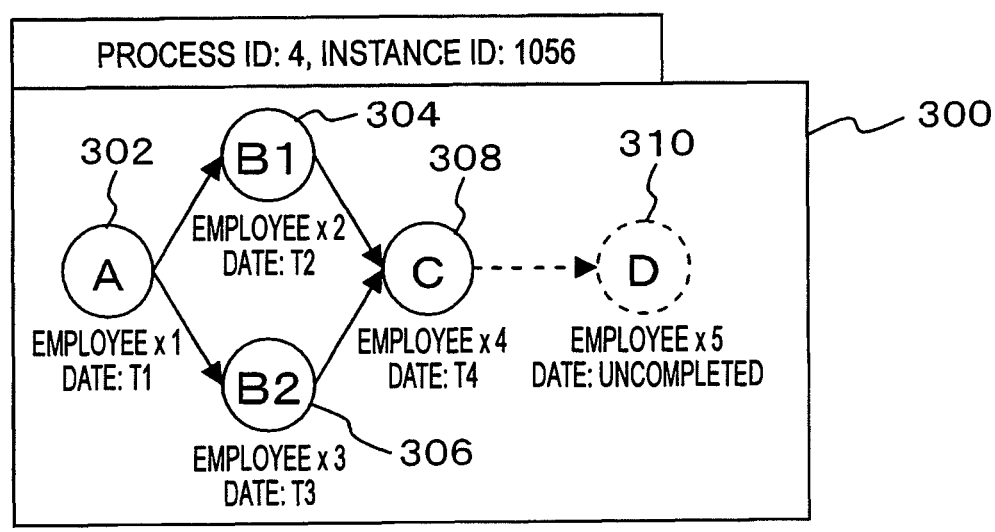
FIG. 3 is an explanatory diagram illustrating an example of an instance of a business process.

Next, information that is managed in the case where the business process is actually executed according to the business process definition will be described. An example according to the business process definition as exemplified in FIG. 2 is illustrated in FIG. 3. FIG. 3 is an explanatory diagram illustrating an example of instance of the business process. Here, the instance means reality (that is also called materialization, realization, and the like) according to the business process definition. That is, in the case of executing businesses, the instance is made so that persons in charge are allocated to the respective businesses, and the progress in that which business was executed at which time point is managed.

The business process instance 300 is composed of a business A (302), a business B1 (304), a business B2 (306), a business C (308), and a business D (310), and each business corresponds to the business process definition 200 as exemplified in FIG. 2. In this case, the business D (310) has not been executed, and thus is indicated by a dotted line. To the instance of the business process, a process ID that indicates the definition of the business process that is the basis and an instance ID that is a code capable of inherently identifying the instance of the business process in an exemplary embodiment of the invention are attached.

The data that indicates the business process instance 300 is stored in the business process definition and reality storage module 114. Each business corresponds to a staff ID that indicates a person in charge who has executed the business, a date (a date at which the business was finished, a date at which the next business started) at which the business was executed. For example, it is indicated that the business A (302) was executed by a staff x1 at the date of T1. Information that corresponds to the respective businesses is stored in the business process definition and reality storage module 114 together with a business process instance table 400. FIG. 4 is an explanatory diagram illustrating an example of a data structure of the business process instance table 400.

The business process instance table 400 includes a business ID section 402, a date section 404, and a person in charge ID section 406. The business ID section 402 stores a business ID which is a code that may inherently identify the business in the instance of the business process that is the subject. The date section 404 stores the date the business was executed. The person in charge ID section 406 stores the person in charge ID that is a code which may inherently identify the person in charge who executed the business.

Also, the business process definition or business process instance table 400 may include information on production requirements or information on the appropriate amount of conveyable information (communication amount) with another person in charge so that they may be used in ABC analysis (priority analysis) as the business contents of the respective businesses.

The business process management module 112 is connected to the business process definition and reality storage module 114. The business process management module 112 manages the definition and instance (reality) of one or more business processes and their status. For example, in accordance with the business process definition, the business process management module 112 may present to the person in charge who executes the business an instruction to the effect that the business is to be executed using an e-mail or the like. If the business is finished, the business process management module 112 stores the ID of the person in charge who executed the business and the date of finish in the business process instance table 400 to correspond to the business ID of the business.

The business process definition and reality storage module 114 is connected to the business process management module 112 and the risk evaluation module 120 during execution of the business process. The business process definition and reality storage module 114 stores information managed by the business process management module 112. For example, the business process, definition and reality storage module 114 stores the business process definition information, the business process instance, and the like.

The activity log/ICT log storage module 130 is connected to the risk evaluation module 120 during execution of the business process. The activity log/ICT log storage module 130 stores logs using an ICT (Information and Communication Technology) system such as a meeting in an actual space, a mail or phone, a TV conference, and the like.

The log of the meeting in an actual space is, for example, a record of persons in charge who met in a certain conference room by tracing IC cards possessed by the persons in charge. For example, the record is stored as an activity log table 500. FIG. 5 is an explanatory diagram illustrating an example of a data structure of the activity log table 500. The activity log table 500 includes an ID section 502, a date section 504, a location section 506, a person in charge ID set section 508, and a meeting time section 510. The ID section 502 stores an ID that inherently identifies the log of the meeting. The date section 504 stores the date the meeting was made. The location section 506 stores a location where the meeting was made (for example, a conference room ID, longitude and latitude information, and the like). The person in charge ID set section 508 stores person in charge IDs of the persons in charge who made the meeting. In this case, one or plural persons in charge may attend the meeting. The meeting time section 510 stores time (which may be a finish time) the meeting was made.

Also, the log of an e-mail is stored in an e-mail log table 600. FIG. 6 is an explanatory diagram illustrating an example of a data structure of the e-mail log table 600. The e-mail log table 600 includes an ID section 602, a date section 604, a source address person in charge ID section 606, and a sender person in charge ID set section 608. The ID section 602 stores an ID that inherently identifies the log of transmission/reception of the e-mail. The date section 604 stores the date the e-mail was transmitted/received. The source address person in charge ID section 606 stores the person in charge ID of the person in charge who transmitted the e-mail. The sender person in charge ID set section 608 stores a set of person in charge IDs of the persons in charge (one or plural persons in charge may be presented) who received the e-mail.

Also, the log of a phone or TV conference is stored in the phone/TV conference log table 700. FIG. 7 is an explanatory diagram illustrating an example of a data structure of the phone/TV conference log table 700. The phone/TV conference log table 700 includes an ID section 702, a date section 704, a person in charge ID set section 706 who executed the meeting, and a meeting time section 708. The ID section 702 store an ID that inherently identifies the log on which the phone or TV conference was made. The date section 704 stores the date the phone or TV conference was made. The person in charge ID set section 706 who executed the meeting stores the set of IDs of the persons in charge who attended the phone or TV conference. The meeting time section 708 stores the time (which may be a finish time) the phone or TV conference was made.

The risk evaluation module 120 during execution of the business process is connected to the business process definition and reality storage module 114, the activity log/ICT log storage module 130, the notification module 142, and the display module 144, and evaluates as a risk the difference between a communication amount of the respective businesses in the instance of the business process and the expected communication amount of the business process by making the business process instance and the communication log correspond to each other based on the information in the business process definition and reality storage module 114 and the activity log/ICT log storage module 130. Hereinafter, this will be described in more detail.

The risk evaluation module 120 during execution of the business process calculates a difference between the amount A of conveyable information that is generated between a person in charge A and a person in charge B when the business constituting the business process is finished and a predetermined amount B of conveyable information which is estimated to be generated between the person in charge A and the person in charge B when the business is finished. Also, the risk evaluation module 120 during execution of the business process adds the differences calculated in the difference calculation process in a combination of the first person in charge A in the business process that is the subject and the second person in charge B in the business process or in another business process related to the business process. This result of addition is used as a risk evaluation value. In this case, the person in charge A and/or the person in charge B may be one person in charge or plural persons in charge in a team or group.

Here, the time when "the business is finished" means the temporal neighborhood of the status change timing. The timing when one business is finished and the next business starts in the business process instance is set to the "status change timing" in the business process. More specifically, in the instance as exemplified in FIG. 3, the date T1 of the business A (302) corresponds to the status change timing. In this case, it is sufficient if the status change timing is specified by an exemplary embodiment of the invention at the date, and the date may be expressed as any one or a combination of year, month, day, hour, minute, second, and below second. Also, the temporal neighborhood of the status change timing means a predetermined period that includes at least the status change timing. The status change timing may be or may not be the center of the period. For example, the period before the status change timing may be long and the period after the status change timing may be short.

The "amount A of conveyable information that is generated between the person in charge A and the person in charge B when the business is finished" means the actually generated communication amount (hereinafter referred to as the "communication amount A"). This communication amount is obtained by measuring the communication amount in the status change timing of the instance.

The "predetermined amount B of conveyable information that is estimated to be generated between the person in charge A and the person in charge B when the business is finished" means an expected communication amount (hereinafter referred to as the "communication amount B") that is necessary in standard to execute the business, and is a predetermined value.

In the business, since it is general that the communication is generated in the temporal neighborhood of the "status change timing", the risk evaluation module 120 during execution of the business process measures the communication amounts A between the persons in charge in the temporal neighborhood, and evaluates the difference between the communication amount A and the expected communication amount B as the risk.

"Another business process" in "another business process related to the business process" has a predetermined relationship with the business process that is the subject, and for example, may correspond to the subject business process in advance.

That is, in the communication range, not only the respective persons in charge of the business process instance but also the persons in charge of the related business process instance may become the subject. For example, as the related business process instance, there is an instance generated from the definition of the same business process, and communication with a person in charge of the instance that has been already finished (a predecessor) or a person in charge of another instance being currently executed is within the communication range. That is, the communication range is determined so as to include communications with persons in charge of not only the business process instance that is the subject but also a business process instance related to the business process instance.

A risk evaluation E(P,t) of the business process instance P at time t is calculated as in Equation (1).

$$E(P, t) = \sum_{P' \in R(P)} \sum_{\substack{\langle m_1, m_2 \rangle \in \\ M(P) \times M(P')}} |C(t, m_1, m_2, P) - B(m_1, m_2, P)| \quad (1)$$

Where, M(p) represents a set of persons in charge of P, M(P') represents a set of persons in charge of P', P' represents another instance related to P, R(P) represents a set that includes another instance related to P and P, $C(t, m_1, m_2, P)$ represents an estimated value (to be described later) of the communication amount performed between the persons in charge $m_1$ and $m_2$ with respect to P at time t, and $B(m_1, m_2, P)$ represents an expected communication amount B between $m_1$ and $m_2$, which is defined in P (Typically, 0 is set between the persons in charge having no dependence relationship, and a value based on the business contents is set between the persons in charge having the dependence relationship).

The calculation portion of an absolute value on the right side of Equation (1) is for calculating a difference between the communication amount A and the communication amount B. Also, by two Σ on the right side of Equation (1), the result of calculation of absolute values is added in a combination of the person in charge A in the business process and the person in charge B in the business process or in another business process related to the business process.

Here, the calculation of $C(t, m_1, m_2, P)$ will be described.

The business process management device 110 may generate information that is stored in the activity log/ICT log storage module 130. In this case, since the business process management device 110 manages which business the activity corresponds to, the information may be stored by making the business IDs correspond to the above-described activity log table 500, the e-mail log table 600, and the phone/TV conference log table 700. In this case, the communication amount A corresponds to the business that is the subject, and the number of communications that are generated in the temporal neighborhood of the status change timing is counted.

Also, a case where the information stored in the activity log/ICT log storage module 130 has been generated regardless of the business process management device 110 will be described. In this case, the information on which business process the communication stored in the activity log/ICT log storage module 130 has been performed in relation to may not be necessarily included.

At the status change timing t in the business process instance P, the communication amount between persons concerned is increased in the temporal neighborhood. The communication amount per unit time that depends upon the status change timing (that is, in the temporal neighborhood of the status change timing) is measured by the difference between the communication amount per unit time in a normal state.

Figure 10:
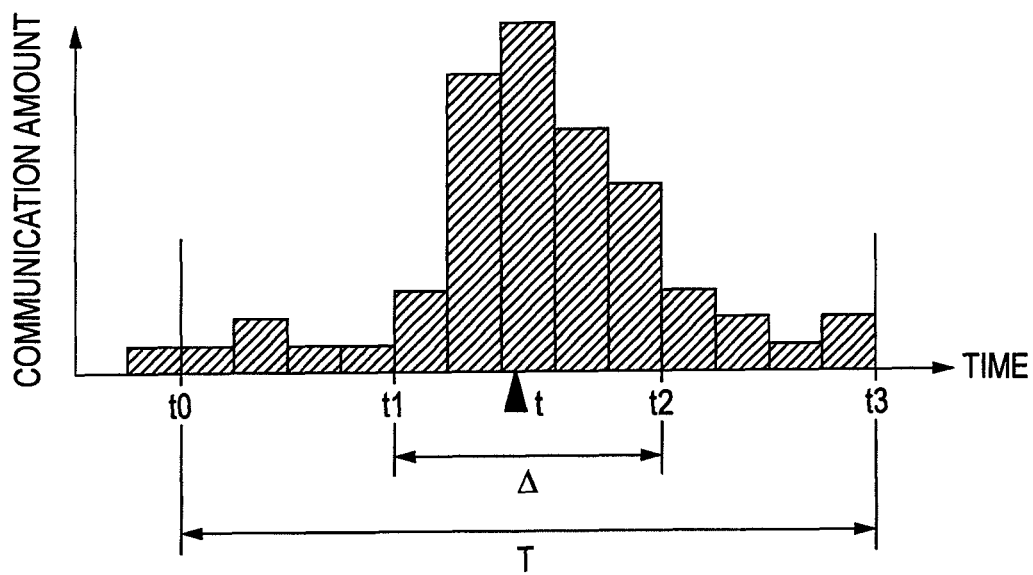
FIG. 10 is an explanatory diagram illustrating an example of the communication amount with the change of time.

FIG. 10 is an explanatory diagram illustrating an example of the communication amount with the change of time. This graph represents the communication amount on the vertical axis, and the time change on the horizontal axis. As exemplified in FIG. 10, in the case of setting a window width T for measuring the temporal neighborhood Δ at time t and the communication amount in a normal state, the communication amount per unit time in the normal state is a value obtained by dividing the integrated value S0 of the communication amount from t0 to t1 and from t2 to t3 by (T−Δ), and the communication amount per unit time in the temporal neighborhood of time t in the normal state is a value obtained by dividing the integrated value S1 of the communication amount from t1 to t2 by Δ. Accordingly, the communication amount per unit time that depends upon the status change of P becomes S1/Δ−S0/(T−Δ).

At this time, the dimension (unit) of the communication amount may be determined according to log. For example, in the case of an activity log or a phone/TV conference, the dimension becomes the time of the meeting (specifically, the meeting time section 510 of the activity log table 500, and the meeting time section 708 of the phone/TV conference table 700), and in the case of an e-mail, the dimension becomes the number of mails (specifically, the number of times the person in charge IDs of the persons in charge that are the subject are stored in the source address person in charge ID 606 of the e-mail log table 600 or in the sender person in charge ID set section 608).

The risk evaluation module 120 during execution of the business process may calculate the communication amount A in accordance with a ratio of periods in which the business processes that are the subject and business processes except for the business processes which are related to the person in charge A and the person in charge B overlap each other. Also, the difference calculation process may calculate the difference between the communication amount A and the communication amount B using the communication amount A that is calculated by the conveyable information amount calculation means.

This is because in the case where the persons in charge $m_1$ and $m_2$, participate in the instance P' of another business process in addition to the instance P of the business process, and the status change timing t' in the business process P' is close to the status change timing t in the business process P, it is obscure whether the communication that $m_1$ and $m_2$ perform is with respect to P or P'. In this case, the fact that t is close to t' means that overlapping occurs in the temporal neighborhood Δ at t and in the temporal neighborhood Δ at t'.

Figure 11:
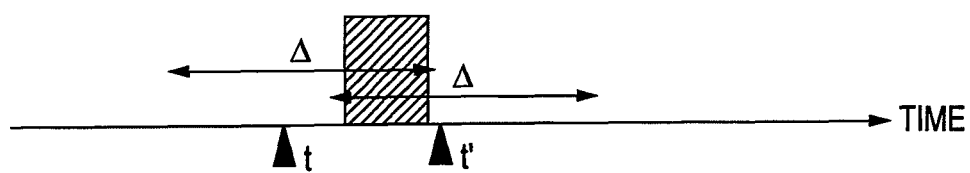
FIG. 11 is an explanatory diagram illustrating an example of an overlap of instances in a business process.

FIG. 11 is an explanatory diagram illustrating an example of an overlap of instances in a business process. As exemplified in FIG. 11, in the case where t is close to t', the temporal neighborhood Δ at t and the temporal neighborhood Δ at t' overlap each other (hatched portion in FIG. 11).

Accordingly, the "accuracy" may be defined as in Equation (2), and the communication amount per unit time may be roughly estimated as in Equation (3).

$$Z(m_1, m_2, t, P) = 1 - \Sigma(\text{the ratio of overlapping of temporal neighborhood } \Delta \text{ at } t \text{ and at } t')/N \quad (2)$$

t'∈{a set of status change timing of instance of business process except for P related to $m_1$ and $m_2$}

The accuracy $Z(m_1, m_2, t, P)$ that the persons in charge $m_1$ and $m_2$ perform the communication related to the instance P of the business process is defined by the ratio of overlapping of Δ in the instance of the business process except for P that $m_1$ and $m_2$ take charge of. In this case, N represents the number of instances of the business process in which $m_1$ and $m_2$ participate at the same time. In an example of FIG. 11, if it is assumed that the overlapping portion of the temporal neighborhood Δ at t and the temporal neighborhood Δ at t' is 25% of Δ, the accuracy becomes 1−0.25/2=0.875.

$$C(t, m_1, m_2, P) = Z(m_1, m_2, t, P) \times (S1/\Delta - S0/(T-\Delta)) \quad (3)$$

As a risk evaluation function at time t of the status change timing of the instance P of the business process, the above-described E(P,t) is used. The risk evaluation function may be an evaluation function as follows.

<Accumulated Risk Amount>

The risk evaluation module 120 during execution of the business process may further add the calculation result of E(P,t) in the business that is finished in a period from the start of the business process instance to the present. By this, the risk evaluation module 120 may calculate the accumulated risk amount EA(P). This calculation result is set as the risk evaluation value. A set of the status change timing in a period from the start of the business process instance P to the present time is set as in Equation (4), and the accumulated risk amount EA(P) is calculated as in Equation (5).

$$ST(P) = \{t1, t2, \ldots, tn\} \tag{4}$$

$$E_A(P) = \sum_{t \in ST(P)} E(P, t) \tag{5}$$

<Risk Amount in Consideration of the Post Multiplicity of a Person in Charge>

The risk evaluation module 120 during execution of the business process may further add the value based on the number of business processes executed by the person in charge A or the person in charge B to the calculation result of E(P,t). This calculation result is set as the risk evaluation value. This is expressed in Equation (6)

$$E_D(P, t) = E(P, t) + \alpha \sum_{m \in M(P)} D(m, t) \tag{6}$$

It is assumed that the number of instances of the executed business process that an employee m takes charge of at time t is D(m,t).

The "risk amount ED(P,t) in consideration of the post multiplicity of a person in charge" is the calculation result that is obtained by adding the sum of the post multiplicity of the employee who takes charge of the process P to the risk amount. In this case, a weight value α is a factor that sets the degree of reflection of the post multiplicity to the risk, and is a predetermined value. For example, an analyzer determines the weight value α in consideration of the complexity of the business of the person in charge. For example, since a complicated business holds the post concurrently and has a high risk, a large weight value α is set, while otherwise, a small weight value α is set.

<Risk Amount Based on Inappropriateness of Timing of the Communication>

The risk evaluation module 120 during execution of the business process may perform the difference calculation process by subtracting the communication value that is generated between the person in charge A and the person in charge B when the business is finished from the predetermined communication amount B that is estimated to be generated between the person in charge A and the person in charge B when the business is finished. This result of calculation is used as a risk evaluation value. In this case, if the value of the result of subtraction is equal to or larger than 0, the risk evaluation module 120 during execution of the business process determines the result as the difference calculated by the difference calculation means, while if the value of the result of subtraction is smaller than 0, the risk evaluation module 120 during execution of the business process determines 0 as the difference calculated by the difference calculation means. This is expressed in Equation (7).

$$E_U(P, t) = \sum_{P' \in R(P)} \sum_{\substack{(m_1, m_2) \in \\ M(P) \times M(P')}} U(B(m_1, m_2, P) - C(t, m_1, m_2, P)) \tag{7}$$

In the case where the communication amount is smaller than the expected communication amount at time t of the status change timing of the instance P of the business process, this is grasped as the risk. In this case, the function U(x) is a function which returns x in the case of x≥0 and returns 0 in the case of x<0.

In this case, the risk evaluation module 120 during execution of the business process may store the above-described communication amount A as in an instance and communication amount table 800. FIG. 8 is an explanatory diagram illustrating an example of a data structure of the instance and communication amount table 800. The instance and communication amount table 800 includes a business ID section 802, a date section 804, and a person in charge A ID section 806, a person in charge B ID section 808, and a communication amount section 810. The business ID section 802 stores a business ID which is a code that may inherently identify the business in the instance of the business process that is the subject. The date section 804 stores the date the business was executed (status change timing). The person in charge A ID section 806 stores the person in charge ID of the person in charge A, who executed the business. The person in charge B ID section 808 stores the person in charge ID of the person in charge B who performed the communication with the person in charge A. The communication amount section 810 stores $C(t,m_1,m_2,P)$ that is calculated by the risk evaluation module 120 during execution of the business process as described above.

Also, the risk evaluation module 120 during execution of the business process may store the above-described communication amount B as in an expected communication amount table 900. FIG. 9 is an explanatory diagram illustrating an example of a data structure of the expected communication amount table 900. The expected communication amount table 900 includes a business ID section 902, a person in charge A ID section 904, a person in charge B ID section 906, and a communication amount section 908. The business ID section 902 stores a business ID which is a code that may inherently identify the business in the instance of the business process that is the subject. The person in charge A ID section 904 stores the person in charge ID of the person in charge A, who executes the business. The person in charge B ID section 906 stores the person in charge ID of the person in charge B who executes the business. The communication amount section 908 stores the predetermined expected communication amount B. In this case, the expected communication amount B may be a value determined according to the business of the business process, a value determined according to a combination of the person in charge A and the person in charge B, or a value determined according to the business of the business process and a combination of the person in charge A and the person in charge B.

The risk evaluation module 120 during execution of the business process calculates a risk evaluation value using the instance and communication amount table 800 and the expected communication amount table 900.

The output module 140 includes a notification module 142 and a display module 144. The output module 140 outputs the calculation results of risk evaluation functions (Equations (1), (5), (6), and (7)) by the risk evaluation module 120 during execution of the business process as the risks of the instance of the business process that is the subject.

The notification module 142 is connected to the risk evaluation module 120 during execution of the business process, and notifies a user of the calculation results of the risk evaluation function by e-mail. For example, the notification module 142 generates a message to the effect of warning by comparing the value of the calculation result with a predetermined threshold value to notify the user of the message.

The display module 144 is connected to the risk evaluation module 120 during execution of the business process, and displays the calculation result of the risk evaluation function on a display device provided in the information processing apparatus according to an exemplary embodiment of the invention.

Figure 12:
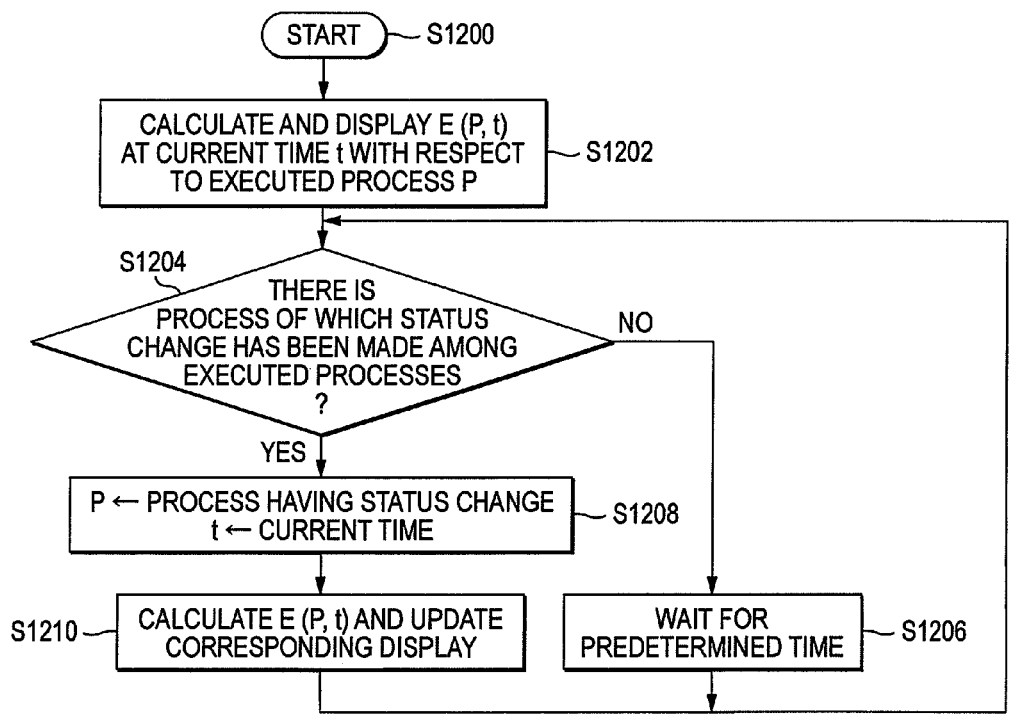
FIG. 12 is a flowchart 1 illustrating a processing example according to an exemplary embodiment of the invention.
Figure 13:
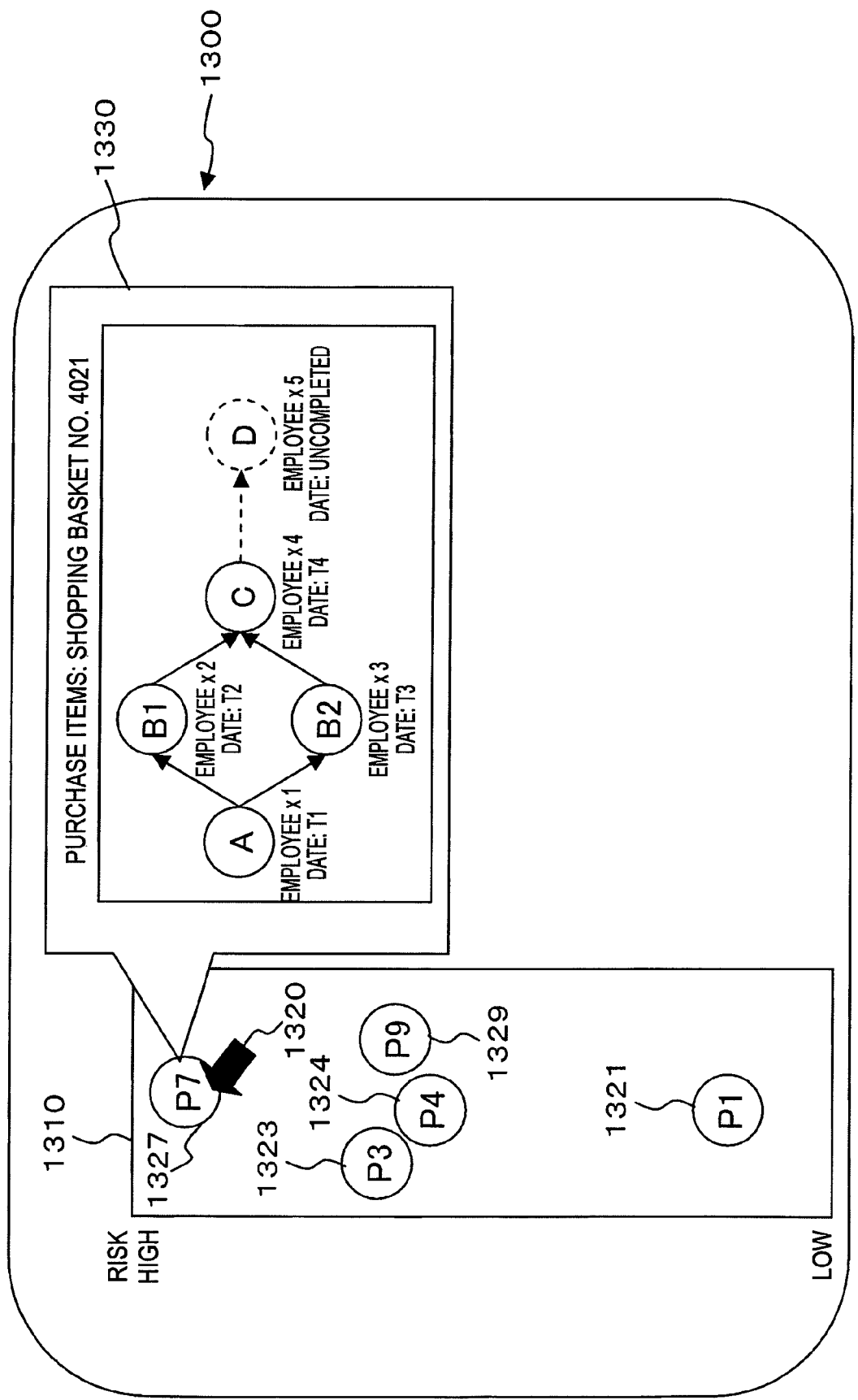
FIG. 13 is an explanatory diagram illustrating an example 1 of a display screen that is presented in an exemplary embodiment of the invention.

FIG. 12 is a flowchart 1 illustrating a processing example according to an exemplary embodiment of the invention. This processing example is an example that downwardly visualizes the risk of the business process being executed. This will be described using FIG. 13. FIG. 13 is an explanatory diagram illustrating a display screen 1300 presented according to an exemplary embodiment of the invention.

In step S1202, the risk evaluation module 120 during execution of the business process calculates the risk evaluation value E(P,t) at the current time t with respect to the instance P of the business process being executed, and the display module 144 display this. For example, as illustrated in FIG. 13, the display module 144 displays a display screen 1300 on the display device installed according to an exemplary embodiment of the invention. A business process instance display area 1310 is displayed in the display screen 1300. Business process instance icons 1321 to 1329 that indicate the instance IDs of the business process are displayed in accordance with the risk evaluation value E(P,t). Also, if any one business process instance icon is indicated by a mouse cursor 1320, a business process instance contents display area 1330 may be displayed. The contents displayed in the business process instance contents display area 1330 are equal to the business process instance 300 as exemplified in FIG. 3, and are the contents of the instance of the business process that is indicated by the mouse cursor 1320. In this case, the business process instance icons are displayed in the business process instance display area 1310 with a height that corresponds to the risk evaluation value E(P,t). In this case, the horizontal positions of the icons are determined using random values so that they do not overlap one another.

In step S1204, the risk evaluation module 120 during execution of the business process determines whether there is an instance of a business process of which the status has been changed among the instances of the business process being executed, and if so, the processing proceeds to step S1208, while otherwise, the processing proceeds to step S1206.

In step S1206, the risk evaluation module 120 during execution of the business process waits for a predetermined time, and then performs the process of step S1204.

In step S1208, the risk evaluation module 120 during execution of the business process substitutes the instance ID of the instance of the business process of which the status change has occurred in a variable P, and substitutes the current time (status change timing) in a variable t.

In step S1210, the risk evaluation module 120 during execution of the business process calculates the risk evaluation value E(P,t), and the display module 144 updates the corresponding display. Then, the risk evaluation module 230 during execution of the business process repeats the processes from the step S1204.

The display module 144 may compare and output the risk of the business process in the case where the finished business process is the subject and the risk of the business process in the case where an interrupted business process is the subject. This is to analyze the problems of the business process by separately displaying the instance of the normally finished business process and the instance of the interrupted business process with respect to the instance of the already completed business process. This processing example will be described using FIGS. 14 and 15.

Figure 14:
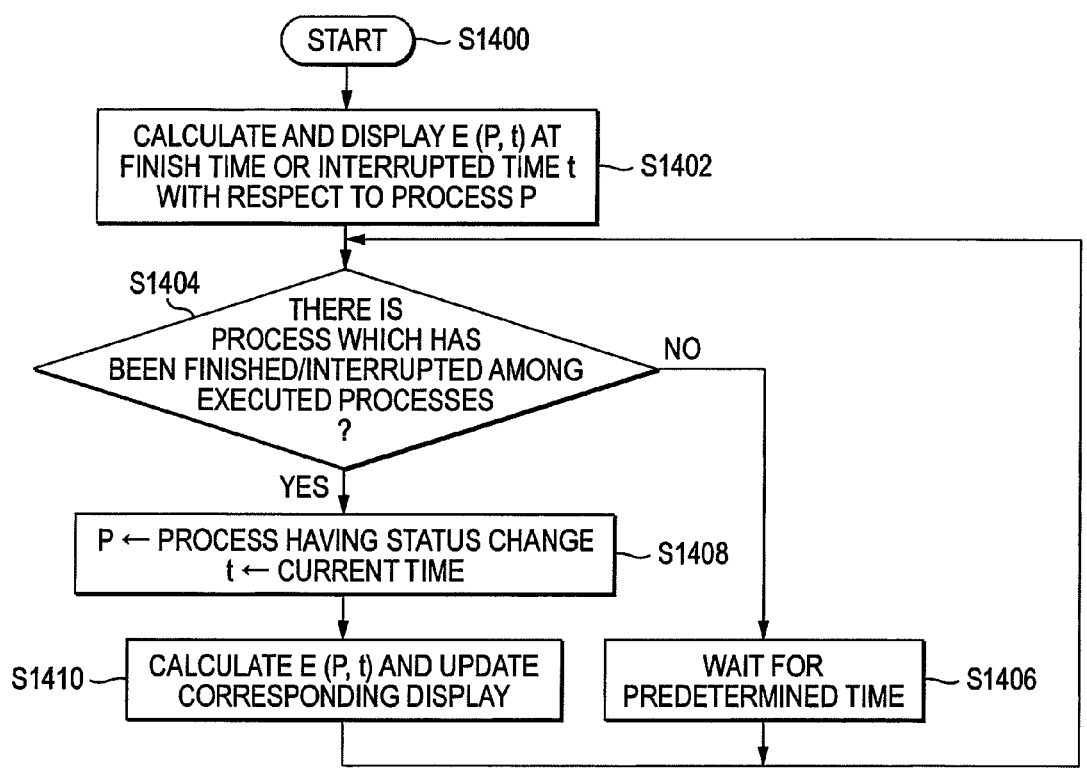
FIG. 14 is a flowchart 2 illustrating a processing example according to an exemplary embodiment of the invention.
Figure 15:
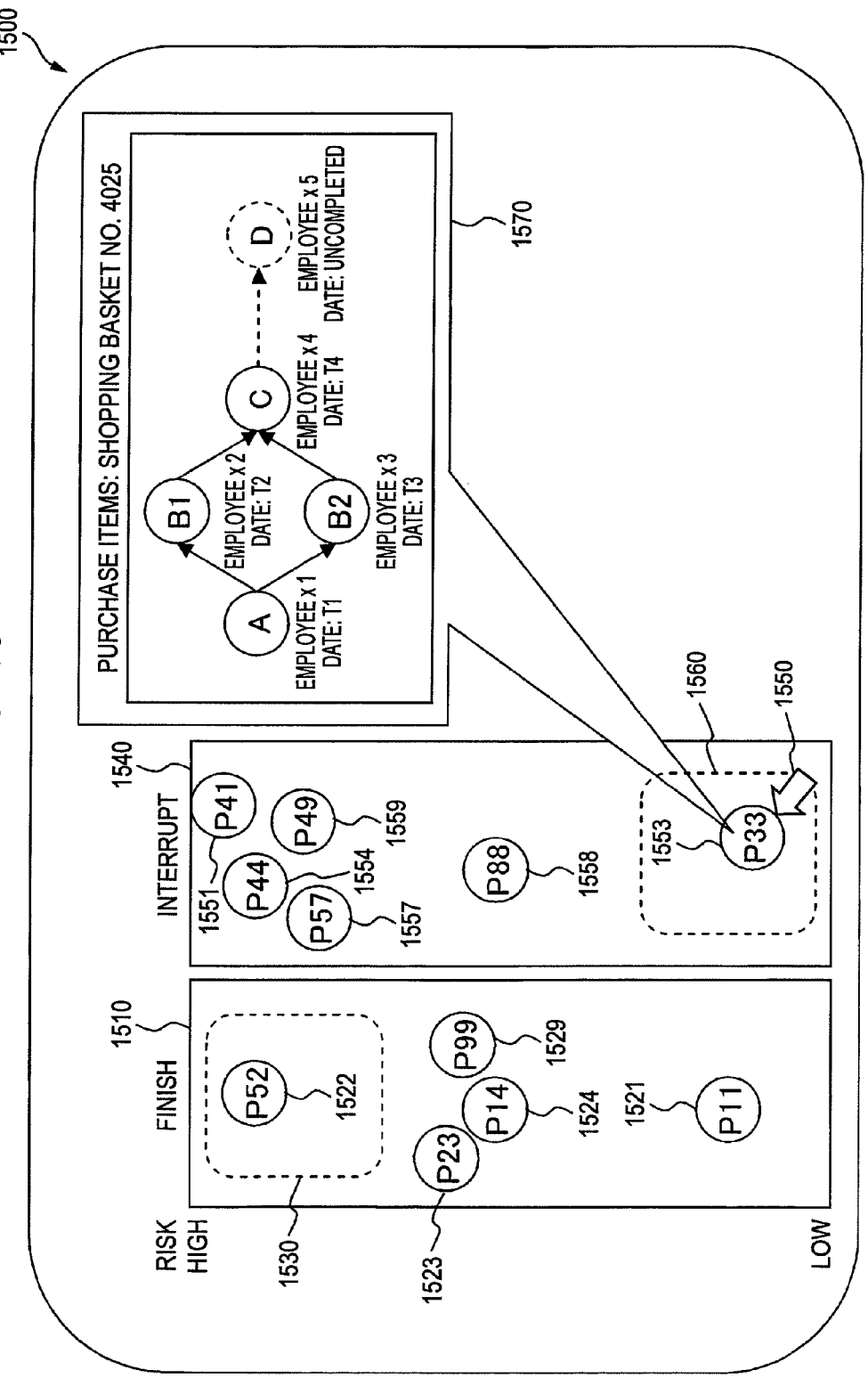
FIG. 15 is an explanatory diagram illustrating an example 2 of a display screen that is presented in an exemplary embodiment of the invention.

FIG. 14 is a flowchart 2 illustrating a processing example according to an exemplary embodiment of the invention, and FIG. 15 is an explanatory diagram illustrating an example of a display screen 1500 that is presented in an exemplary embodiment of the invention.

In step s1402, the risk evaluation module 120 during execution of the business process calculates the risk evaluation value E(P,t) at the finish time or interruption time t with respect to the instance P of the business process, and the display module 144 display this. For example, as illustrated in FIG. 15, the display module 144 displays a display screen 1500 on the display device installed according to an exemplary embodiment of the invention. A finished business process instance display area 1510 and an interrupted business process instance display area 1540 are displayed in the display screen 1500. Business process instance icons 1521 to 1529 that indicate the instance IDs of the business process are displayed in the finished business process instance display area 1510 in accordance with the risk evaluation value E(P,t), and business process instance icons 1551 to 1559 that indicate the instance IDs of the business process are displayed in the interrupted business process instance display area 1540 in accordance with the risk evaluation value E(P,t).

Also, the display module 144 displays a problematic business process instance display area 1530 in the finished business process instance display area 1510. The display module 144 selects the display area in which the risk evaluation value E(P,t) is larger than a predetermined threshold value as a display area to be displayed in the problematic business process instance display area 1530. These are displayed as normally finished in spite of the large risk evaluation value, and thus there is a possibility to improve them.

Also, the display module 144 displays a problematic business process instance display area 1560 in the interrupted business process instance display area 1540. The display module 144 selects the display area in which the risk evaluation value E(P,t) is smaller than a predetermined threshold value as a display area to be displayed in the problematic business process instance display area 1560. These are displayed as being interrupted (not normally finished) in spite of the small risk evaluation value, and thus there is a possibility to improve them.

The instance group of the business process that is normally finished in spite of the high risk and the instance group of the business process that is interrupted in spite of the low risk may have a possibility that there is a problem in the design of the business process, and such a display enables a user to easily find the problem.

Also, if any one business process instance icon is indicated by a mouse cursor 1550, a business process instance contents display area 1570 may be displayed. The contents displayed in the business process instance contents display area 1570 are equal to the business process instance 300 as exemplified in FIG. 3, and are the contents of the instance of the business process that is indicated by the mouse cursor 1320. In this case, the business process instance icons are displayed in the finished business process instance display area 1510 and in the interrupted business process instance display area 1540 with a height that corresponds to the risk evaluation value E(P,t). In this case, the horizontal positions of the icons are determined using random values so that they do not overlap one another.

In step S1404, the risk evaluation module 120 during execution of the business process determines whether there is an instance of a business process which is finished or interrupted among the instances of the business process being executed, and if so, the processing proceeds to step S1408, while otherwise, the processing proceeds to step S1406.

In step S1406, the risk evaluation module 120 during execution of the business process waits for a predetermined time, and then performs the process of step S1404.

In step S1408, the risk evaluation module 120 during execution of the business process substitutes the instance ID of the instance of the business process of which the status change has occurred in a variable P, and substitutes the current time (status change timing) in a variable t.

In step S1410, the risk evaluation module 120 during execution of the business process calculates the risk evaluation value E(P,t), and the display module 144 updates the corresponding display. Then, the risk evaluation module 230 during execution of the business process repeats the processes from the step S1404.

Although in the description using FIGS. 12 and 14, E(P,t) is used as the risk evaluation value, other risk evaluation values (Equations (5), (6), and (7)) may be used.

Figure 16:
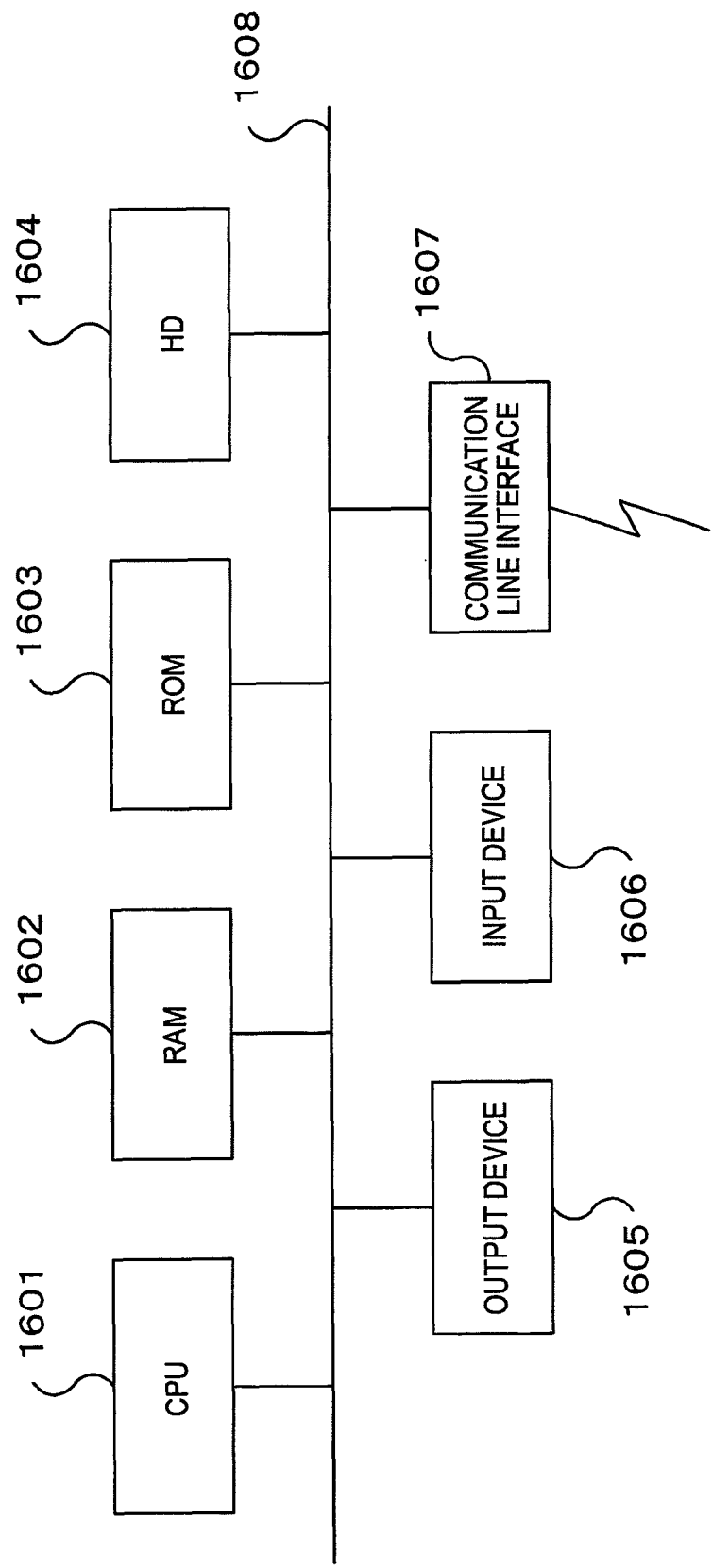
FIG. 16 is a block diagram illustrating an example of a computer hardware configuration that is realized in an exemplary embodiment of the invention.

The hardware configuration of a computer in which a program according to an exemplary embodiment of the invention is, as exemplified in FIG. 16, a general computer, and specifically, a personal computer, a computer that may serve as a server, and the like. That is, as a concrete example, a CPU 1601 is used as a processing unit (operation unit), and a RAM 1602, a ROM 1603, and an HD 1604 are used as storage devices. AS the HD 1604, for example, a hard disc may be used. The hardware configuration includes a CPU 1601 that perform programs such as the risk evaluation module 120 during execution of the business process, the output module 140, the business process management module 112, and the like, a RAM 1602 storing programs or data, a ROM 1603 storing programs for starting the computer, an HD 1604 that is an auxiliary storage device, an input device 1606 for inputting data such as a keyboard, a mouse, and the like, an output device 1605 such as a CRT or liquid crystal display, a communication line interface 1607 for connecting to a communication network such as a network interface card, and a bus 1608 for connecting them to exchange data among them. A plurality of computers may be connected through a network.

The above-described exemplary embodiment by the computer program may be realized in cooperation with software and hardware resources by making the system of the hardware configuration read the computer program that is software.

In this case, the hardware configuration illustrated in FIG. 16 represents one configuration example. An exemplary embodiment of the invention is not limited to the configuration illustrated in FIG. 16, and any configuration that executes the modules as explained in an exemplary embodiment of the invention may be used. For example, some modules may be configured by dedicated hardware (for example, ASIC and the like), or may be provided in an external system and be connected through communication lines. Further, a plurality of systems, as illustrated in FIG. 16, may be connected by communication lines to operate in cooperation with one another. Also, the configuration according to an exemplary embodiment of the invention may be assembled on an information home appliance, a copy machine, a facsimile, a printer, a multifunction peripheral (an image processing device having two or more functions of a scanner, a printer, a copy machine, a facsimile, and the like) in addition to the personal computer.

In the foregoing description of the exemplary embodiments of the invention, any one equation among Equations (1), (5), (6), and (7) is used as a risk evaluation function. However, a combination thereof may be used. That is, a plurality of risk evaluation values may be calculated. Also, a plurality of risk evaluation functions may be selected according to a user's selection operation. Also, a plurality of risk evaluation values may be calculated, and as the risk evaluation value, a problematic risk evaluation value may be selected and displayed. The selection of the problematic risk evaluation value may be performed by comparing the risk evaluation functions with the predetermined threshold value.

The above-described program may be stored in a recording medium to be provided or may be provided by a communication means. In this case, for example, the above-described program may be grasped as an invention for "computer readable recording medium recorded with a program".

The "computer readable recording medium recorded with a program" means a recording medium that is readable by a computer recorded with a program, which is used for program installation, execution, program distribution, and the like.

In this case, examples of recording media include "DVD-R, DVD-RW, DVD-RAM, and the like" which correspond to the standard appropriated in the DVD Forum as a digital versatile disc (DVD), "DVD+R, DVD+RW, and the like" which correspond to the standard appropriated in the DVD+RW, a read only memory (CD-ROM), a CD recordable (CD-R), a CD rewritable (CD-RW), and the like as compact discs (CD), a Blu-ray disc (registered trade name), an opto-magnetic disc (MO), a flexible disc (FD), a magnetic tape, a hard disc, a read only memory (ROM), an electrically erasable and programmable read only memory (EEPROM), a random access memory (RAM), and the like.

Also, the above-described programs or a portion thereof may be recorded in the recording medium for preservation or distribution. Also, the programs or a portion thereof may be transmitted by communications, for example, using a transmission media such as a wire network that is used in a local area network (LAN), a metropolitan area network (MAN), a wide area network (WAN), an Internet, intranet, extranet, and the like, a wireless communication network, or a combination thereof, or may be carried on carrier waves.

Also, the above-described program may be a portion of another program, or may be recorded in a recording medium together with a separate program. Also, the program may be dividedly recorded in a plurality of recording media. Also, if the program may be compressed, encrypted, or restored, it may be recorded in any type.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

[Description Of Reference Numerals And Signs]
 110: business process management device
 112: business process management module
 114: business process definition and reality storage module
 120: risk evaluation module during execution of business process
 130: activity log/ICT log storage module
 140: output module
 142: notification module
 144: display module

What is claimed is:

1. An information processing apparatus comprising:
one or more processors configured to:
calculate a difference between a first communication amount that is generated between a first person in charge and a second person in charge when a business that constitutes a business process is finished and a second communication amount that is to be generated between the first person in charge and the second person in charge when the business that constitutes the business process is finished;
add the calculated differences in a combination of the first person in charge in the business process and the second person in charge in the business process or in another business process related to the business process; and
output the sum of the calculated differences as a risk evaluation E(P,t) of the business processes calculated according to:

$$E(P, t) = \sum_{P' \in R(P)} \sum_{\substack{(m_1, m_2) \in \\ M(P) \times M(P')}} |C(t, m_1, m_2, P) - B(m_1, m_2, P)|$$

wherein M(p) represents a set of persons in charge of P, M(P') represents a set of persons in charge of P', P' represents another instance related to P, R(P) represents a set that includes another instance related to P and $C(t, m_1, m_2, P)$ represents the first communication amount performed between the first person in charge $m_1$ and the second person in charge $m_2$ with respect to P at time t, and $B(m_1, m_2, P)$ represents the second communication amount B between the first person in charge $m_1$ and the second person in charge $m_2$.

2. The information processing apparatus according to claim 1, wherein the one or more processors are further configured to:
calculate, prior to calculating the difference, the first communication amount in accordance with a ratio of periods in which the business processes and a business process related to the first person in charge and the second person in charge except for the business processes overlap each other.

3. The information processing apparatus according to claim 1, wherein the one or more processors are configured to perform the calculation and the addition in a period from the start of the business process to a current time and add the results of the addition, and
output the added results as risks in the business process.

4. The information processing apparatus according to claim 1, wherein the one or more processors are configured to:
add a value based on the number of business processes that are executed by the first person in charge or the second person in charge to the result of the added differences to generate a final result, and
output the final result as risks in the business process.

5. The information processing apparatus according to claim 1, wherein the one or more processors are configured to:
subtract the first communication amount that is generated between the first person in charge and the second person in charge when the business is finished from the second communication amount that is to be generated between the first person in charge and the second person in charge when the business is finished, and
if the value of the result of subtraction is equal to or larger than 0, determine the result as the calculated difference, while if the value of the result of subtraction is smaller than 0, determine 0 as the calculated difference.

6. The information processing apparatus according to claim 1, wherein the one or more processors are configured to:
compare the risks of the business processes in the case where the finished business process is the subject and the risks of the business processes in the case where an interrupted business process is the subject and output the comparison result.

7. A non-transitory computer readable medium storing a program causing a computer to execute a process for information processing, the process comprising:
calculating a difference between a first communication amount that is generated between a first person in charge and a second person in charge when a business that constitutes a business process is finished and a second communication amount that is to be generated between the first person in charge and the second person in charge when the business that constitutes the business process is finished;
adding the calculated differences in a combination of the first person in charge in the business process and the second person in charge in the business process or in another business process related to the business process; and
outputting the added differences risk a evaluation E(P,t) of the business processes calculated according to:

$$E(P, t) = \sum_{P' \in R(P)} \sum_{\substack{(m_1, m_2) \in \\ M(P) \times M(P')}} |C(t, m_1, m_2, P) - B(m_1, m_2, P)|$$

wherein M(p) represents a set of persons in charge of P, M(P') represents a set of persons in charge of P', P' represents another instance related to P, R(P) represents a set that includes another instance related to P and $C(t, m_1, m_2, P)$ represents the first communication amount performed between the first person in charge $m_1$ and the second person in charge $m_2$ with respect to P at time t, and $B(m_1, m_2, P)$ represents the second communication amount B between the first person in charge $m_1$ and the second person in charge $m_2$.

* * * * *